United States Patent
Chupeau et al.

(10) Patent No.: US 12,430,845 B2
(45) Date of Patent: Sep. 30, 2025

(54) VOLUMETRIC VIDEO WITH LONG-TERM PATCH ENTITY MEMORY

(71) Applicant: InterDigital CE Patent Holdings, SAS, Paris (FR)

(72) Inventors: Bertrand Chupeau, Rennes (FR); Renaud Dore, Rennes (FR); Gerard Briand, Ploufragan (FR); Julien Fleureau, Rennes (FR); Remy Gendrot, Montgermont (FR); Franck Thudor, Rennes (FR); Neus Sabater, Betton (FR); Thierry Tapie, Rennes (FR)

(73) Assignee: InterDigital CE Patent Holdings, SAS, Paris (FR)

(*) Notice: Subject to any disclaimer, the term of this patent is extended or adjusted under 35 U.S.C. 154(b) by 108 days.

(21) Appl. No.: 18/285,947

(22) PCT Filed: Apr. 12, 2022

(86) PCT No.: PCT/EP2022/059755
§ 371 (c)(1),
(2) Date: Oct. 6, 2023

(87) PCT Pub. No.: WO2022/218981
PCT Pub. Date: Oct. 20, 2022

(65) Prior Publication Data
US 2024/0193857 A1    Jun. 13, 2024

(30) Foreign Application Priority Data
Apr. 15, 2021 (EP) .................. 21305494
Apr. 16, 2021 (EP) .................. 21305507

(51) Int. Cl.
  G06T 17/00    (2006.01)
  H04N 13/279   (2018.01)
  H04N 19/597   (2014.01)

(52) U.S. Cl.
  CPC .......... G06T 17/00 (2013.01); H04N 13/279 (2018.05); H04N 19/597 (2014.11)

(58) Field of Classification Search
  CPC ....... G06T 17/00; G06T 15/10; H04N 13/279; H04N 19/597; H04N 21/2353;
  (Continued)

(56) References Cited

U.S. PATENT DOCUMENTS

2021/0067757 A1* 3/2021 Yun ................. H04N 13/282
2021/0144404 A1* 5/2021 Aflaki Beni ......... H04N 13/268
(Continued)

FOREIGN PATENT DOCUMENTS

EP   3515067 A1   7/2019
EP   3709273 A1   9/2020
(Continued)

OTHER PUBLICATIONS

Anonymous, "Information Technology—Coding of Audio-Visual Objects—Part 10: Advanced Video Coding", International Standard, ISO/IEC 14496-10, Second Edition, Oct. 1, 2004, 280 pages.
(Continued)

*Primary Examiner* — Maurice L. McDowell, Jr.
(74) *Attorney, Agent, or Firm* — Condo Roccia Koptiw LLP

(57) ABSTRACT

Methods and devices for encoding and decoding 3D scenes of an immersive video are disclosed with the related data stream. Taking advantage of the fact that parts of the 3D scene does not change from one frame of the video to another, even when the cameras move and/or the lighting condition change, dynamic and static parts of the 3D scene
(Continued)

are encoded in different atlases. In an embodiment, static patch atlases are repeated between two updates. In another embodiment, only updates are encoded and transmitted. The decoder maintains a memory associating entity of the 3D scene with a set of static patches that is updated with instructions linked to update static patch atlases. At each presentation time the static part of the 3D scene to decode is obtained from the memory.

20 Claims, 7 Drawing Sheets

(58) Field of Classification Search
CPC ........... H04N 21/21805; H04N 13/161; H04N 13/117; H04N 13/178; H04N 13/332; H04N 13/349
See application file for complete search history.

(56) References Cited

U.S. PATENT DOCUMENTS

| | | | | |
|---|---|---|---|---|
| 2021/0383590 | A1* | 12/2021 | Roimela | H04N 19/597 |
| 2023/0239508 | A1* | 7/2023 | Boyce | G06T 9/005 |
| | | | | 375/240.12 |

FOREIGN PATENT DOCUMENTS

| | | | | |
|---|---|---|---|---|
| WO | WO-2019209838 | A1* | 10/2019 | G06T 9/00 |
| WO | WO 2019243663 | A1 | 12/2019 | |

OTHER PUBLICATIONS

Grange, et al., "VP9 Bitstream & Decoding Process Specification", Google, Inc., Version 0.6, Mar. 31, 2016, 171 pages.

ITU, "Information Technology—Digital Compression and Coding of Continuous-Tone Still Images—Requirements and Guidelines", Terminal Equipment and Protocols for Telematic Services, The International Telegraph and Telephone Consultative Committee (CCITT), T.81, Sep. 1992, 186 pages.

ITU_T, "Advanced video coding for generic audiovisual services", ITU-T H.264, International Telecommunication Union, ITU-T Telecommunication Standardization Sector of ITU, Series H: Audiovisual and Multimedia Systems, Infrastructure of Audiovisual Services—Coding of Moving Video, Jan. 2012, pp. 1-680.

ITU-T, "High Efficiency Video Coding", H.265, Telecommunications Standardization Sector of ITU, Series H: Audiovisual and Multimedia Systems, Infrastructure of Audiovisual Services—Coding of Moving Video, Oct. 2014, 540 pages.

ITU-T, "High Efficiency Video Coding", Recommendation ITU-T H.265, Series H: Audiovisual and Multimedia Systems, Infrastructure of Audiovisual Services—Coding of Moving Video, Feb. 2018, 692 pages.

Rivaz, et al., "AV1 Bitstream & Decoding Process Specification", The Alliance for Open Media, AC1 Bitstream Specification V 1.0.0, AOMediaCodec/ac1-spec project, Jun. 25, 2018, 677 pages.

Information Technology—Coded Representation of Immersive Media—Part 5: Visual Volumetric Video-based Coding (V3C) and Video-based Point Cloud Compression (V-PCC), International Organization of Standardization (ISO) and International Electrotechnical Commission (IEC), FDIS Stage, ISO/IEC JTC 1/SC 29/WG 11, ISO/IEC 23090-5:2020 (E), 2020, 303 pages.

"Information technology—MPEG systems technologies—Part 12:Image File Format", International Organization of Standardization (ISO) and International Electrotechnical Commission (IEC), ISO/IEC JTC 1/SC 29 N, ISO/IEC FDIS 23008-12, 2nd edition, MPEG N18310, Jun. 26, 2015, 107 pages.

"Information technology—Coded representation of immersive media—Part 12:MPEG Immersive video", International Organization of Standardization (ISO) and International Electrotechnical Commission (IEC), ISO/IEC JTC 1/SC 29, ISO/IEC 23090-12:2021(E), FDIS Stage, 2021, 83 pages.

"Information technology—Coded representation of immersive media—Part 10: Carriage of Visual Volumetric Video-based Coding Data", International Organization of Standardization (ISO) and International Electrotechnical Commission (IEC), ISO/IEC JTC 1/SC 29/WG 11, ISO 23090-10:2020 (E). DIS Stage, 2020, 80 pages.

"Test Model 8 for MPEG Immersive Video", International Organization for Standardization, ISO/IEC JTC 1/SC 29/WG4, N0050, Jan. 29, 2021, 49 pages.

* cited by examiner

VOLUMETRIC VIDEO WITH LONG-TERM PATCH ENTITY MEMORY

CROSS REFERENCE TO RELATED APPLICATIONS

This application is a U.S. National Stage Application under 35 U.S.C. § 371 of International Patent Application No. PCT/EP2022/059755, filed Apr. 12, 2022, which is incorporated herein by reference in its entirety.

This application claims priority to European Application No. 21305494.3, filed Apr. 15, 2021, and European Application No. 21305507.2, filed Apr. 16, 2021, each of which is incorporated herein by reference in its entirety.

1. TECHNICAL FIELD

The present principles generally relate to the domain of three-dimensional (3D) scene and volumetric video content as a sequence of 3D scenes. The present document is also understood in the context of the encoding, the formatting and the decoding of data representative of the texture and the geometry of a 3D scene for a rendering of volumetric content on end-user devices such as mobile devices or Head-Mounted Displays (HMD). In particular, the present document relates to the encoding of a sequence of 3D scenes comprising parts that are static during a sub-sequence of the video.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a way to perform such a recording, even if technical difficulties remain.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (aka. 3DoF+) restricts the user viewing space to a limited volume called viewing bounding box, allowing limited translation of the head and parallax experience. This second context is a valuable trade-off between free navigation and passive viewing conditions of a seated audience member.

In a sequence of 3D scenes, it is common to find static parts, that is objects or areas of the scene that are the same from one 3D scene of the sequence to another one. Typically, the ground and background (e.g. buildings when outside or walls when inside) do not change for sub-sequences of the volumetric video. These parts correspond to physical entities of the 3D scene. They are static in the frame of reference of the 3D scene. When projected onto patches, a static part produces static patch if the camera rig is still and the attribute values of the patches remain constant if the lighting conditions do not change over the time. When the camera rig moves (e.g. during a traveling) the depth values of projected patches changes. When the lighting changes, this is the attribute (e.g. color) that changes. However, even in such cases, a static part of the 3D scene keeps its static property.

Significant gains in pixel-rate (i.e. the number of pixels needed to encode a 3D scene) and bit-rate (i.e. the size of the bitstream after compression) are expected with a better encoding, for example, if in particular static parts of the 3D scene are better taken into account. There is a lack of a format that leverages this property (static parts) of sequences of 3D scene for encoding, transmitting and decoding volumetric video.

3. Summary

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate a method for rendering a 3D scene of a sequence of 3D scenes. The method comprises:
- obtaining, from a data stream, a first atlas packing first patches for the 3D scene;
- obtaining entries from a local data base, an entry associating an entity with second patches for the 3D scene, an entity being a part of the 3D scene; and
- rendering the 3D scene by inverse projecting first and second patches.

In an embodiment, the method further comprises:
- obtaining, from the data stream, a second atlas packing patches for the 3D scene;
- obtaining, from the data stream, metadata indicating, for an entity of the 3D scene, an instruction of a set of instruction comprising:
  - creating, for the 3D scene, a new entry in the local memory associating the entity with a subset of patches of the second atlas;
  - updating with a subset of patches of the second atlas, for the 3D scene, the entry of the local memory associating the entity with second patches; and
  - deleting from the local memory, the entry associating the entity with second patches;
- and applying the actions indicating in metadata to the local memory before the obtaining of the entries.

In another embodiment, the entries from the local data base for the 3D scene are the entries of the local data base for the previous 3D scene in the 3D scene sequence.

The present principles also relate to a device comprising a processor associated with a memory, the processor being configured to execute the method above.

The present principles also relate to a method for encoding a 3D scene of a sequence of 3D scenes in a data stream. The method comprises:
- obtaining dynamic patches of the 3D scene;
- packing dynamic patches in a first atlas;
- obtaining static patches of the 3D scene, a static patch being associated with an entity of the 3D scene;
- on condition that static patches differ from the static patches of the previous 3D scene in the sequence:
  - packing static patches in a second atlas and generating metadata indicating, for an entity of the 3D scene, an instruction for the client to:
    - create, for the 3D scene, a new entry in a local memory associating the entity with static patches associated with the entity;
    - update with static patches associated with the entity, for the 3D scene, the entry of the local memory associating the entity with static patches; or
    - delete from the local memory, the entry associating the entity with static patches;
  - encoding the first atlas, the second atlas and the metadata in the data stream;
- otherwise, encoding the first atlas in the data stream.

In an embodiment, the method comprises, on condition that static patches are the same than the static patches of the previous 3D scene in the sequence, packing the static patches in a second atlas and encoding the first atlas and the second atlas in the data stream.

The present principles also relate to a device comprising a processor associated with a memory, the processor being configured to execute the method above.

The present principles also relate to a data stream carrying or a non-transitory computer-readable medium storing:
- a first atlas packing first patches;
- a second atlas packing second patches; and
- metadata indicating, for an entity of the 3D scene, an instruction for the client to:
  - create, for the 3D scene, a new entry in a local memory associating the entity with static patches associated with the entity;
  - update with static patches associated with the entity, for the 3D scene, the entry of the local memory associating the entity with static patches; or
  - delete from the local memory, the entry associating the entity with static patches;

4. BRIEF DESCRIPTION OF DRAWINGS

The present disclosure will be better understood, and other specific features and advantages will emerge upon reading the following description, the description making reference to the annexed drawings wherein.

5. DETAILED DESCRIPTION OF EMBODIMENTS

Figure 1:
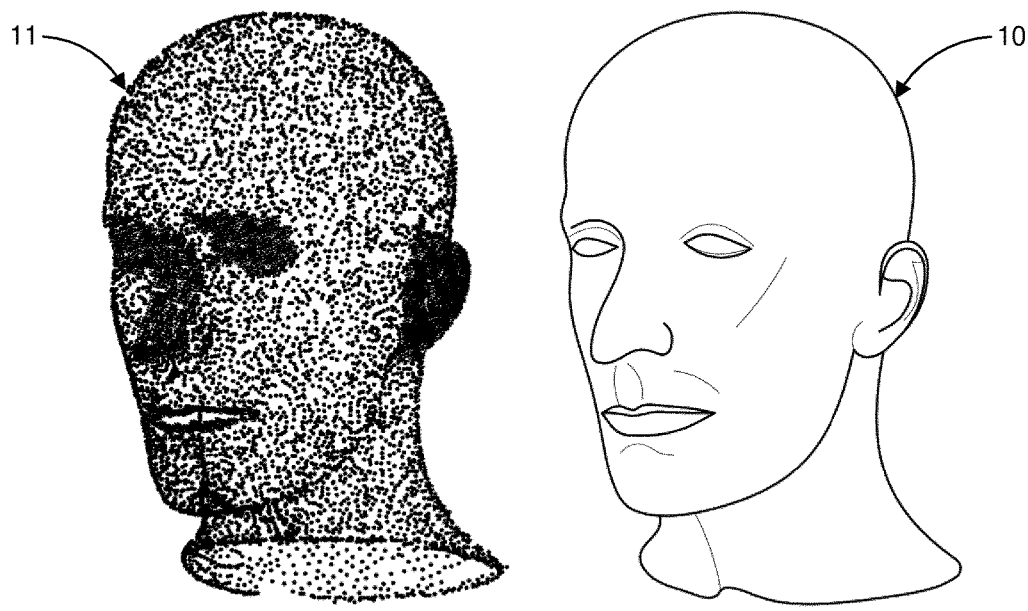
FIG. 1 shows a three-dimension (3D) model of an object and points of a point cloud corresponding to the 3D model, according to a non-limiting embodiment of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

FIG. 1 shows a three-dimensional (3D) model 10 of an object and points of a point cloud 11 corresponding to 3D model 10. 3D model 10 and the point cloud 11 may for example correspond to a possible 3D representation of an object of the 3D scene comprising other objects. 3D model 10 may be a 3D mesh representation and points of point cloud 11 may be the vertices of the mesh. Points of point cloud 11 may also be points spread on the surface of faces of the mesh. 3D model 10 may also be represented as a splatted version of point cloud 11, the surface of 3D model 10 being created by splatting the points of the point cloud 11. 3D model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:

from a capture of a real object shot by a rig of cameras, optionally complemented by depth active sensing device;

from a capture of a virtual/synthetic object shot by a rig of virtual cameras in a modelling tool;

from a mix of both real and virtual objects.

A 3D scene corresponds to a captured scene, that is a part of a real (or virtual) scene. First, some parts or the scene to be captured are invisible (because occulted) from every camera; these parts are outside of the 3D scene. Second, the field of view of the rig of cameras may be lower that 360°. Then a part of the real scene remains outside of the captured 3D scene. Nevertheless, some parts outside of the 3D scene may be reflected on parts of the 3D scene.

Figure 2:
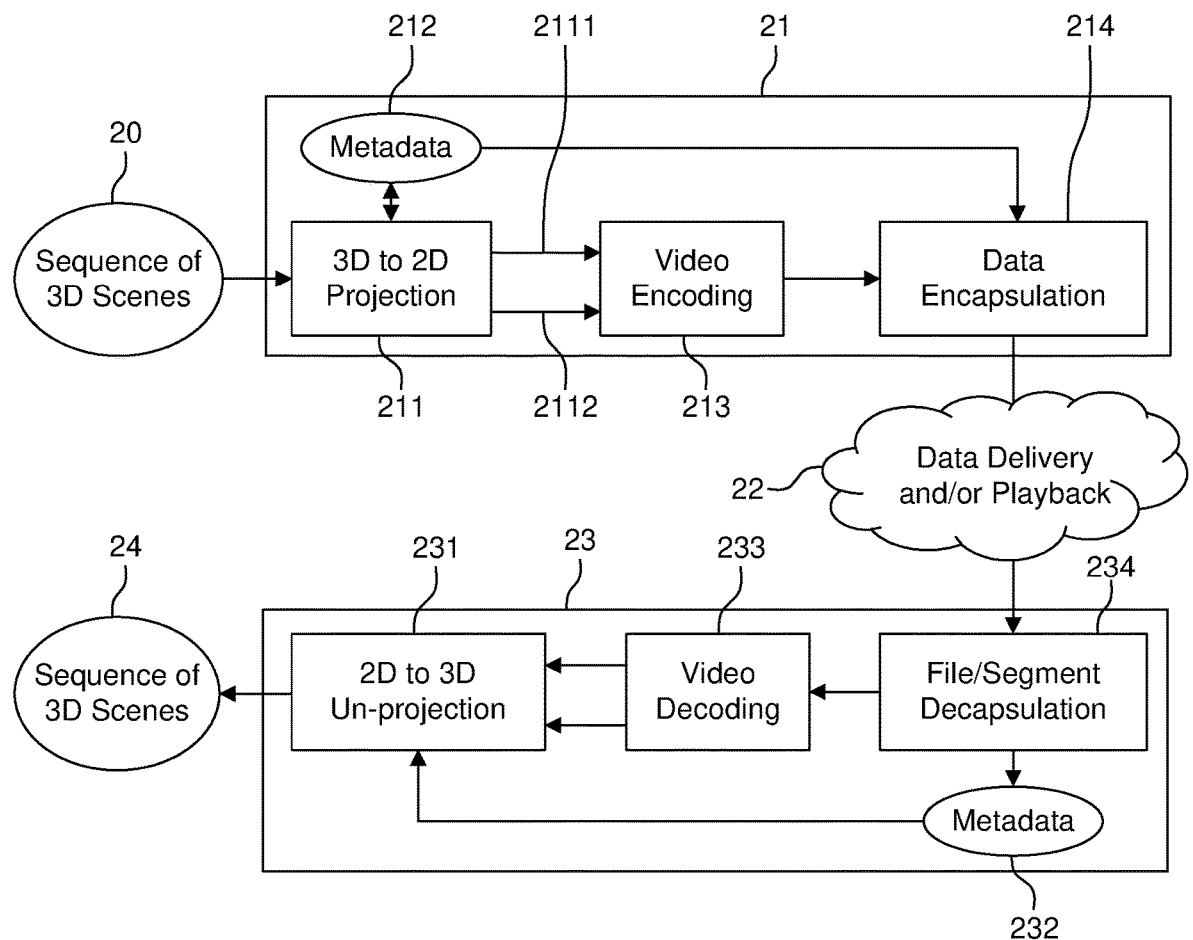
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes may be provided to a volumetric video rendering device for a 3DoF, 3Dof+ or 6DoF rendering and displaying.

Sequence of 3D scenes 20 is provided to an encoder 21. The encoder 21 takes one 3D scenes or a sequence of 3D scenes as input and provides a bit stream representative of the input. The bit stream may be stored in a memory 22 and/or on an electronic data medium and may be transmitted over a network 22. The bit stream representative of a sequence of 3D scenes may be read from a memory 22 and/or received from a network 22 by a decoder 23. Decoder 23 is inputted by said bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises depth information representative of the 3D scene projected onto frame 2111. In a variant, Frame 2111 comprises other attributes. According to the present principles, projected attributes may be representative of the texture (i.e. color attribute), the heat, the reflectance or other attribute of the 3D scene projected on the frame. In a variant, information is encoded in separate frames, for instance two separate frames 2111 and 2112 or in one frame per attribute. At this step, circuit 211 may distinguish between 2D projections that vary from one 3D scene of sequence 20 to 2D projections that are the same for two or more consecutive 3D scenes of sequence 20.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7. Metadata may also comprise information associating a projection with an object or apart of an object of the 3D scene, herein called entities of the 3D scene. For instance, circuit 211 may generate a projection map per entity and signal in the metadata which entity a projection map corresponds to.

A video encoding circuit 213 encodes sequence of frames 2111 and 2112 as a video. Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

Encoder 213 is for example compliant with an encoder such as:
JPEG, specification ISO/CEI 10918-1 UIT-T Recommendation T.81, https://www.itu.int/rec/T-REC-T.81/en;
AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-I/en);
3D-HEVC (an extension of HEVC whose specification is found at the ITU website, T recommendation, H series, h265, http://www.itu.int/rec/T-REC-H.265-201612-I/en annex G and I);
VP9 developed by Google; or
AV1 (AOMedia Video 1) developed by Alliance for Open Media.

According to the Present Principles

The data stream is stored in a memory that is accessible, for example through a network 22, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD). Decoder 23 obtains the stream from a source 22. For example, source 22 belongs to a set comprising:

a local memory, e.g. a video memory or a RAM (or Random-Access Memory), a flash memory, a ROM (or Read Only Memory), a hard disk;
a storage interface, e.g. an interface with a mass storage, a RAM, a flash memory, a ROM, an optical disc or a magnetic support;
a communication interface, e.g. a wireline interface (for example a bus interface, a wide area network interface, a local area network interface) or a wireless interface (such as a IEEE 802.11 interface or a Bluetooth® interface); and
a user interface such as a Graphical User Interface enabling a user to input data.

Decoder 23 comprises a circuit 234 for extract data encoded in the data stream. Circuit 234 takes a data stream as input and provides metadata 232 corresponding to metadata 212 encoded in the stream and a two-dimensional video. The video is decoded by a video decoder 233 which provides a sequence of frames. Decoded frames comprise color and depth information. In a variant, video decoder 233 provides two sequences of frames, one comprising color information, the other comprising depth information. A circuit 231 uses metadata 232 to un-project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

At the rendering, the viewport images that the user is watching at are synthetized views, that is views on the scene that has not been captured by a camera. If a specular reflection is captured by one camera of the acquisition rig, as observed from the point of view of this camera, rendering the 3D scene from a different virtual viewpoint requires modifying the position and appearance of the reflected content according to the new point of view. According to the present principles, information for a rendering of complex light effect is carried in the data stream.

Figure 3:
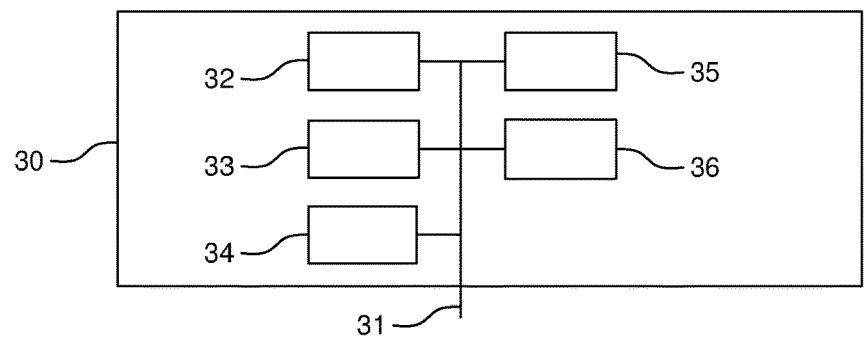
FIG. 3 shows an example architecture of a device which may be configured to implement a method described in relation with FIGS. 9 and 10, according to a non-limiting embodiment of the present principles.
Figure 9:
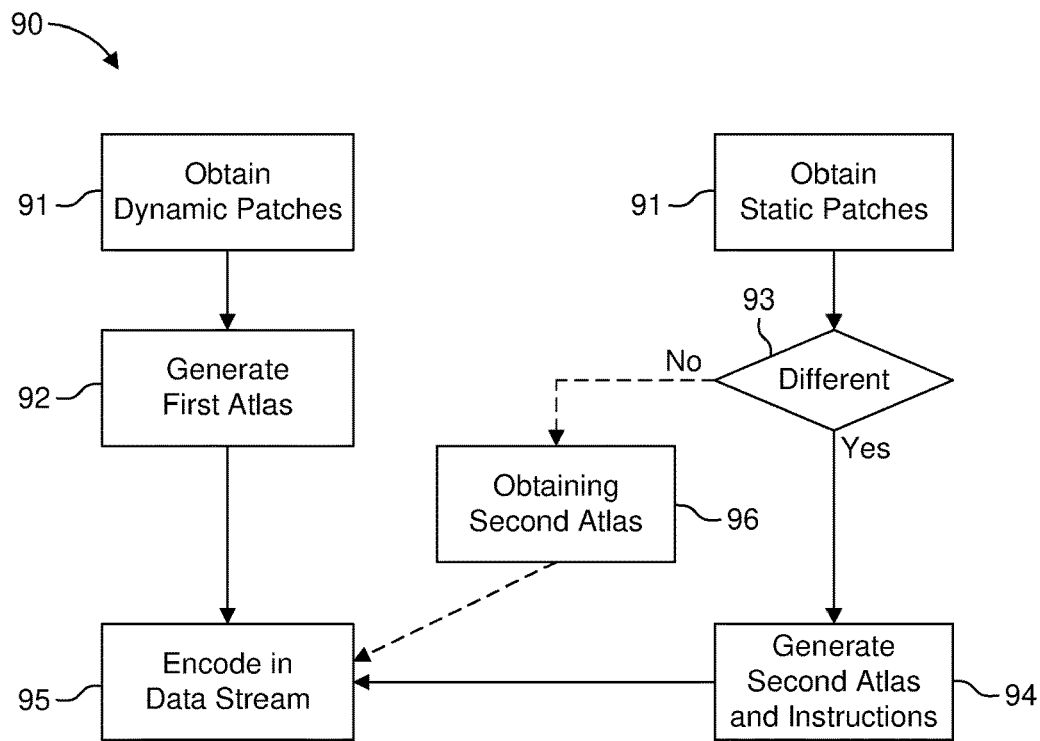
FIG. 9 illustrates a method for encoding a 3D scene according to a non-limiting embodiment of the present principles.
Figure 10:
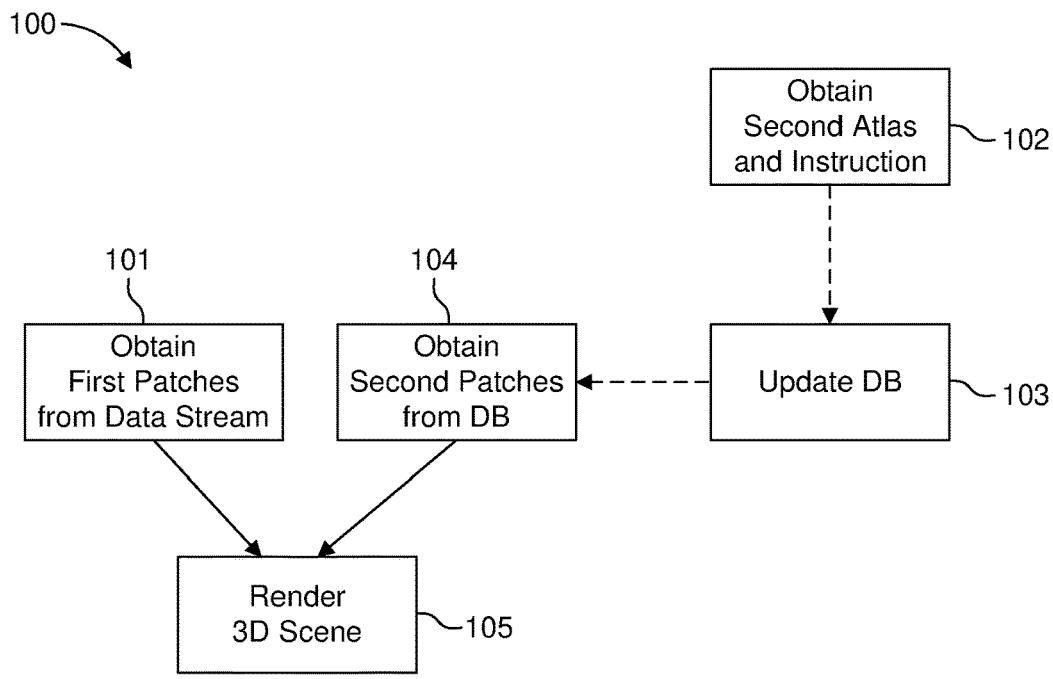
FIG. 10 illustrates a method for rendering a 3D scene from a data stream according to a non-limiting embodiment of the present principles.

FIG. 3 shows an example architecture of a device 30 which may be configured to implement a method described in relation with FIGS. 9 and 10. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:
a microprocessor 32 (or CPU), which is, for example, a DSP (or Digital Signal Processor);
a ROM (or Read Only Memory) 33;
a RAM (or Random Access Memory) 34;
a storage interface 35;
an I/O interface 36 for reception of data to transmit, from an application; and
a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIGS. 9 and 10, and belongs to a set comprising:
  a mobile device;
  a communication device;
  a game device;
  a tablet (or tablet computer);
  a laptop;
  a still picture camera;
  a video camera;
  an encoding chip;
  a server (e.g. a broadcast server, a video-on-demand server or a web server).

Figure 4:
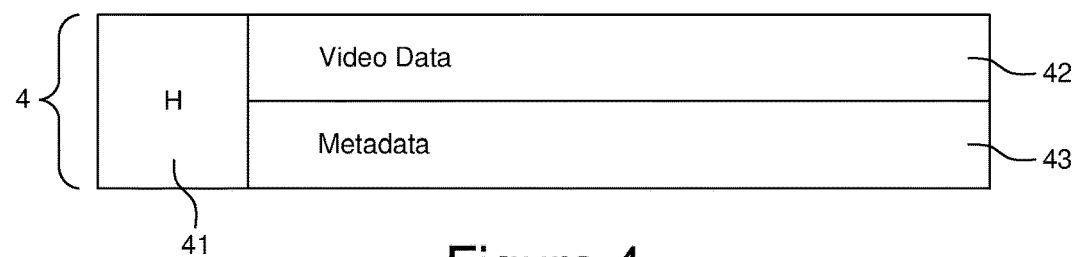
FIG. 4 shows an example of an embodiment of the syntax of a stream when the data are transmitted over a packet-based transmission protocol, according to a non-limiting embodiment of the present principles.

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards).

Figure 5:
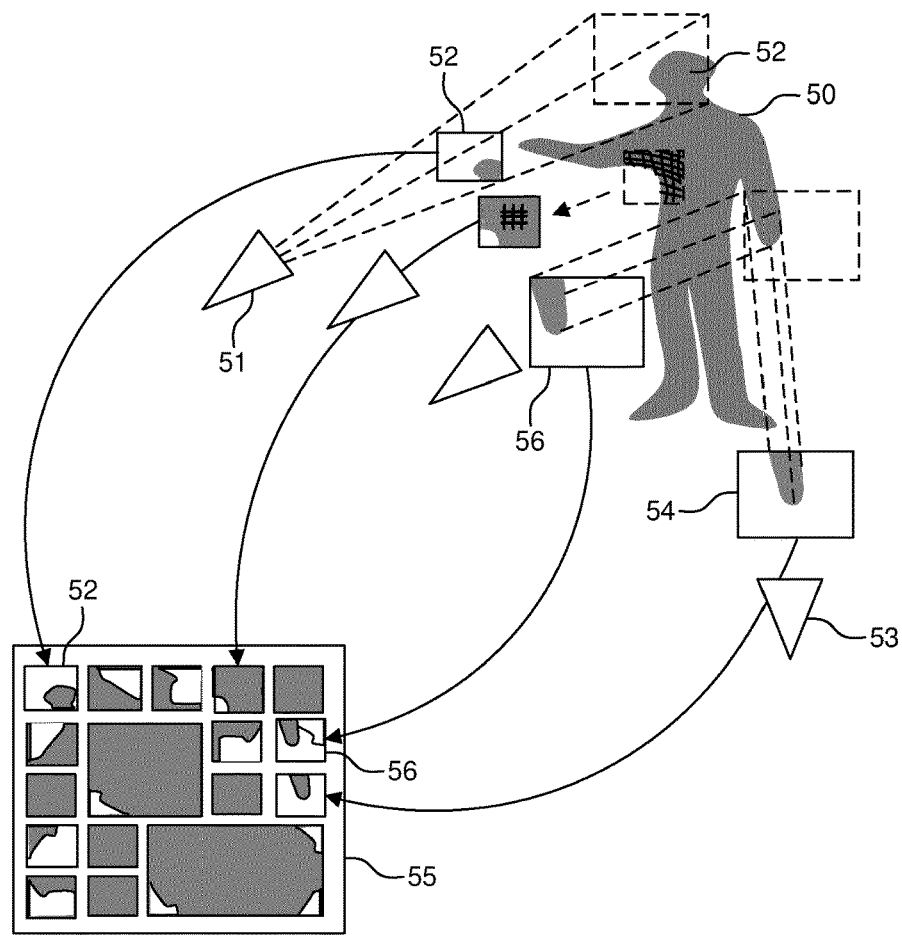
FIG. 5 illustrates the patch atlas approach with an example of 4 projection centers, according to a non-limiting embodiment of the present principles.

FIG. 5 illustrates the patch atlas approach with an example of 4 projection centers. 3D scene 50 comprises a character. For instance, center of projection 51 is a perspective camera and camera 53 is an orthographic camera. Cameras may also be omnidirectional cameras with, for instance a spherical mapping (e.g. Equi-Rectangular mapping) or a cube mapping. The 3D points of the 3D scene are projected onto the 2D planes associated with virtual cameras located at the projection centers, according to a projection operation described in projection data of metadata. In the example of FIG. 5, projection of the points captured by camera 51 is mapped onto patch 52 according to a perspective mapping and projection of the points captured by camera 53 is mapped onto patch 54 according to an orthographic mapping.

The clustering of the projected pixels yields a multiplicity of 2D patches, which are packed in a rectangular atlas 55. The organization of patches within the atlas defines the atlas layout. In an embodiment, two atlases with identical layout: one for texture (i.e. color) information and one for depth information. Two patches captured by a same camera or by two distinct cameras may comprise information representative of a same part of the 3D scene, like, for instance patches 54 and 56.

The packing operation produces a patch data for each generated patch. A patch data comprises a reference to a projection data (e.g. an index in a table of projection data or a pointer (i.e. address in memory or in a data stream) to a projection data) and information describing the location and the size of the patch within the atlas (e.g. top left corner coordinates, size and width in pixels). Patch data items are added to metadata to be encapsulated in the data stream in association with the compressed data of the one or two atlases.

Existing formats for encoding atlas-based representation of 3D scene, like MIV format (Text of ISO/IEC DIS 23090-12 MPEG Immersive Video, ISO/IEC JTC 1/SC 29/WG 4, N00049), does not provide tools or features to leverage the high temporal redundancy of most 3D scenes. The MIV standard, for example, allows to split out the patch-based 3D scene description into multiple atlases (which can themselves be divided into multiple tiles). The patch packing layout and associated projection parameters associated with those atlases are transmitted into a separate "atlas data" sub-bitstream. Full and self-contained ("intra coded") refreshes of the entire atlas data are only permitted by the MIV profiles, by sending atlas frames at given successive time instants. Whereas the corresponding geometry and attribute (e.g; texture, transparency) samples of the patch atlases are transmitted at the full video frame rate in the video sub-bitsreams. The TMIV reference software (Test Model 8 for MPEG Immersive Video, ISO/IEC JTC 1/SC 29/WG 4, N00050) implements a periodic regular refresh of the atlas data every other 32 video frames, which corresponds to the encoding intra-period of the video bit streams, for optimized video encoding.

The V3C specification (Text of ISO/IEC DIS 23090-5 (2E) Visual Volumetric Video-based Coding (V3C) and Video-based Point Cloud Compression, ISO/IEC JTC 1/SC 29/WG 7, N00065), that MIV is an extension of, offers alternative predictive encoding modes for patch data within the atlas data sub-bitstream, namely 'inter', 'merge' or 'skip', which are not activated by MIV. But such alternative patch encoding modes enable reducing only the bitrate of the atlas data sub-bitstream, which bit-rate is negligible with regard to the other video sub-bitstreams that make the MIV bitstream.

According to the present principles, a transmission format is provided to efficiently support a compact and flexible description of 3D scenes with large parts having constant, or only slowly evolving, geometry and appearance. In addition, for entities that are static in the physical world of the 3D scene, encoding and decoding techniques are proposed when the camera rig is moving and/or when the lighting conditions evolve over time.

When the camera moves, static 3D scene parts are seen as moving parts in the frame of reference of the camera rig. According to the present principles, at encoder side the camera rig motion is estimated (pose parameters=position and orientation) and transmitted to the decoder. Doing so, the patches of the static scene parts transmitted are used at later times at decoder side, with a compensation of the camera movement.

The lighting condition change case is very frequent in sequence of 3D scenes (even full CGI 3D scenes). In this case, the geometry does not change but the appearance does because of varying lighting or shadows. According to the present principles, the texture (i.e. color attribute) of static patches is updated more frequently than the geometry attribute. In another embodiment, a compact expression of texture changes under the form of a parametric mathematical function is encoded in the data stream and transmitted to the decoder.

The main elements of a proposed method according to the present principles are:

At encoder stage, the static or quasi-static 3D scene parts are identified, and their patch-based description is separated from the description of the rest of the scene;

The static patches are clustered into a set of long-term persistence entities; When lighting conditions or camera movements are detected for static patches, metadata describing these changes are added to the scene representation.

The static patch description is refreshed at entity granularity, only when needed by the 3D scene evolution;

The decoder maintains a data structure in memory (e.g. a database) of decoded patches in memory to render the static parts of the scene, by updating the entities (erase, rewrite, add) when required. If metadata describing lighting condition changes or camera movements are encoded in the representation of the 3D scene, static patches are adapted accordingly.

Figure 6:
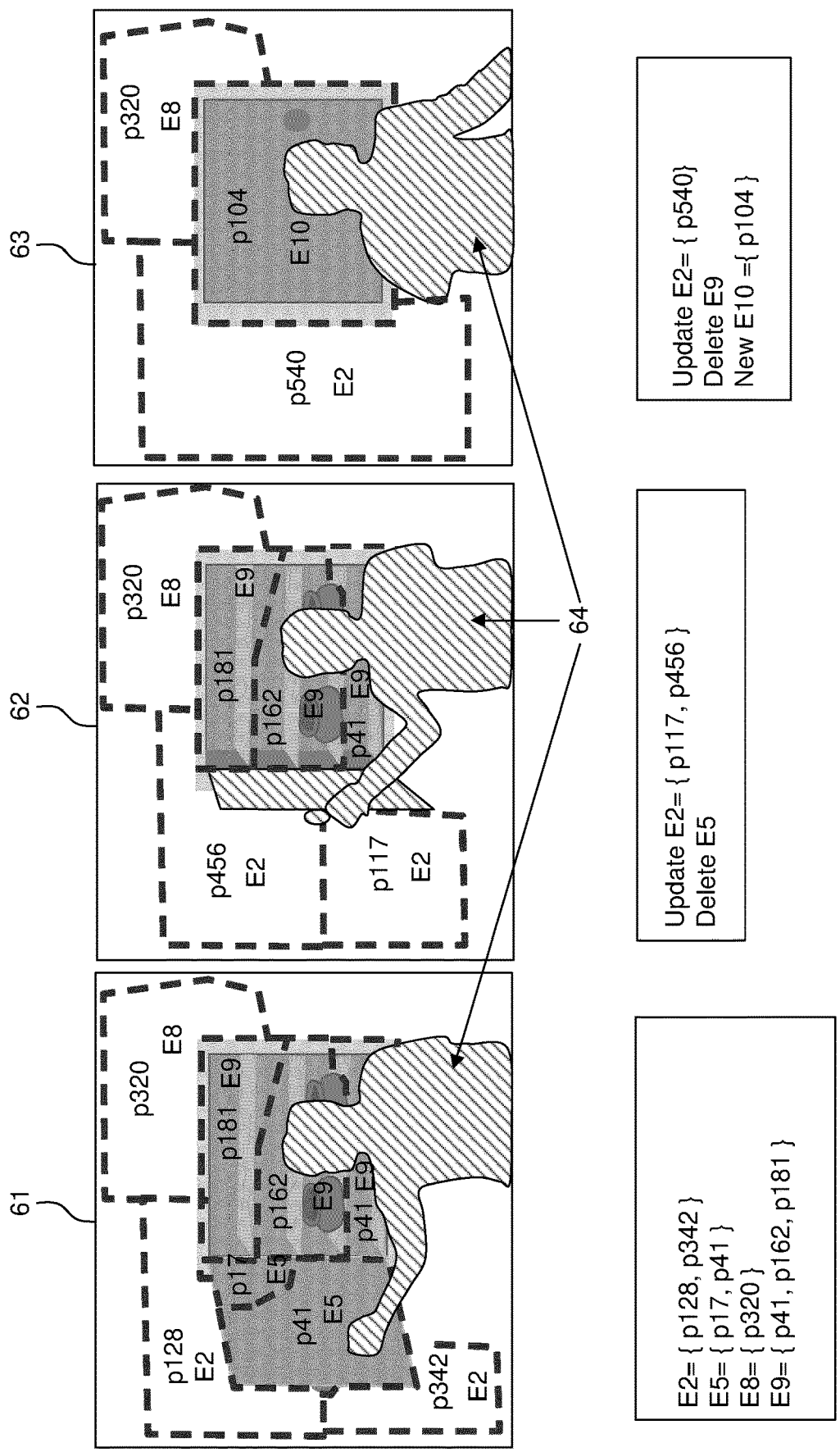
FIG. 6 illustrates an example of three 3D scenes of a sequence of 3D scenes at three different time of the volumetric video.

FIG. 6 illustrates an example of three 3D scenes 61, 62 and 63 of a sequence of 3D scenes at three different time of the volumetric video. The three 3D scenes 61, 62 and 63 comprise a wall, a cupboard, and a moving character in foreground. The three 3D scenes take place at different positions i, i+n and i+n+m in the sequence of 3D scenes. Parts 64 of the 3D scene, that comprises the moving character and the door when closing are represented by patches that are different from one 3D scene to the next one in the sequence of 3D scenes.

FIG. 6 shows five entities: E2 and E8 being parts of the wall, E5 being the inside of the door of the cupboard, E10, the outside of the door, and E9, the inside of the cupboard. An entity may be projected on one or several patches. Entity E8 is embodied by patch p320 in every 3D scene of the sequence. In other words, patch p320 is static: it has the same values (depth and attributes like color, transparency, reflectance, . . . ) during the entire sequence. Other entities of the example of FIG. 6 are embodied by patches that remain static between two 3D scenes. Entity E2 is associated with patches p128 and p342 in frame 61. These patches are static during n frames (i.e. 3D scenes of the sequence) and are replaced by patches p456 and p117 at frame 62. Indeed, because the door of the cupboard is closing, new points of the scene are visible from the cameras positions and patches associated with this part of the wall are changed. Finally, at frame 63, a unique patch p540 is sufficient to represent entity E2. The immobile inside of the door E5 is represented by patches p17 and p41 at frame 61. As soon as the door begins to close, patches for this entity change at every frame and there is no longer any need to keep a track of entity E5. When the door is closed and immobile again, entity E10 is represented by patch p104, starting at frame 63. The inside of the cupboard E9 is composed of three patches p181, p162 and p41 at frame 61. They remain static during n+m frames until frame 62 because points projected on these patches are visible from cameras even if the character and the door are moving in front of them. At frame 63, the inside of the cupboard is no longer visible and entity E9 is removed from the list of entities. In the scene example of FIG. 6, it is relevant not to transmit at each frame data representing the wall and the cupboard, while it is necessary to transmit continuously dynamic part 64.

According to the present principles, a 3D scene is represented as a collection of identifiable, referenceable objects, herein called entities.

The 3D scene representation according to the present principles may be compared to computer graphics interface (CGI) approach:

In a CGI scene, every object is defined by out-of-band means (by modelling tools typically like Maya, Blender . . . ), and the permanent synthetic objects are sent once to the client in a server-client architecture like in some cloud gaming delivery architecture.

Using the present 3D scene representation, instead of defining a scene by an out-of-band means as a set of synthetic objects with mesh, textures, shaders like in CGI, the scene is defined by a set of small pieces defined in MIV form (i.e. patches with geometry+ texture and other attributes) generated by the multi-camera capture and scene analysis processing. This is a camera-based scene generation.

In MIV patch atlas-based formats, the patches generated by the scene cut-out process (with pruning, etc.) of the TMIV encoder may completely change from one intra period (e.g. 32 frames long) to another intra-period. A more stable scene cut-out is possible, by having those objects typically attached to the physical world of the 3D scene. The entities according to the present principles are not defined by a high-level semantics like 'chair', 'wall', 'head' . . . Instead, they are generated by an algorithm which cuts conforming to criteria like texture uniformity, packing efficiency, etc.

The present principles correspond to in-band generation of a scene description as a set of objects attached to the physical world of the 3D scene, and to the problem of making the delivery of that camera-based scene more efficient. This scene delivery is made more efficient by observing that a large part of volumetric content is static, completely or partly, and that it is worth not to repeat static parts at each frame. In a patch atlas-based representation, patches are numerous (typically several hundreds) and volatile (changing every intra-period). According to the present principles, an entity is a collection of patches, preferably small (e.g. tens). While the set of patches within an entity may evolve over time, its collection is expected to remain stable as regards to its position and cumulated footprint in the physical 3D world. It is possible for the underlying patches of an entity to overlap over each other. So, entities may also overlap over each other.

When a static entity is updated, a new collection of patches is transmitted (with their geometry and attribute components, together with the 2D-to-3D projection parameters required for the inverse projection). According to the present principles, additional update information is transmitted in the form of adaptation parameters, at a different frame frequency, to manage cameras movement and/or lighting condition changes.

Figure 11:
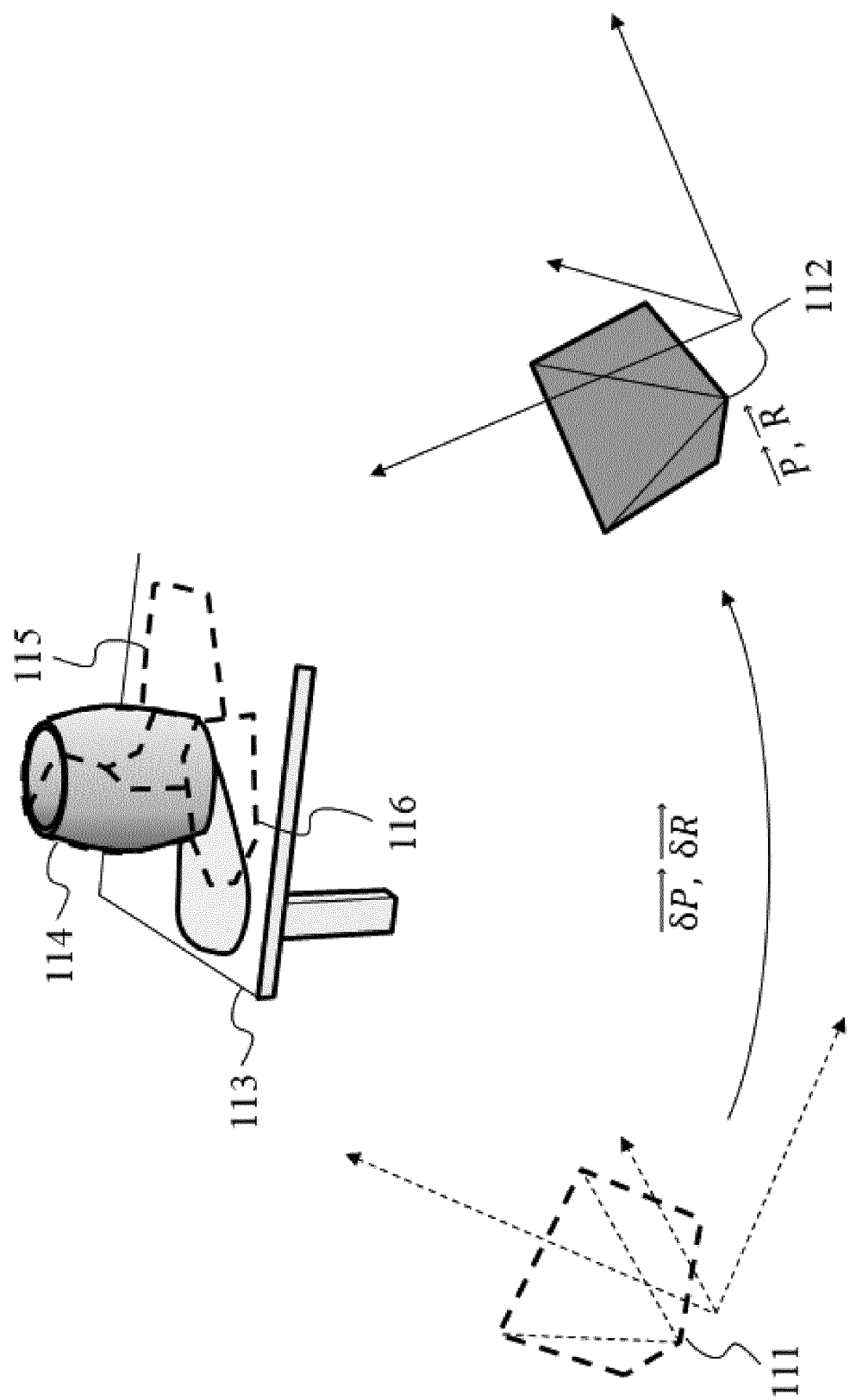
FIG. 11 illustrates a scenario in which an acquisition system is moving within the physical world of the 3D scene, according to a non-limiting embodiment of the present principles.

FIG. 11 illustrates a scenario in which an acquisition system is moving within the physical world of the 3D scene. When the multi-camera rig is not fix but moving, in a travelling for example, all scene parts are moving relatively to the frame of reference attached to the camera rig. The new appearance of the complete 3D scene has to be transmitted at each frame. In existing formats, new patches are transmitted at each frame. However, patch acquired at a first pose of the camera rig, for static scene parts, is still valid and usable later one, but seen from another viewpoint. In addition, 3DoF+ and 6DoF techniques are based on view synthesis. According to the present principles, the encoding format takes advantage of this properties.

In the example of FIG. 11, the physical world of the 3D scene comprises a table 113 and a vase 114 totally static in the physical 3D world (but not as seen from camera point of view 111 and 112). At each frame, and according to the pose of the camera rig, patches are segmented within the acquired views. It is important to notice that patches are generated from a same view (i.e. the image captured by a given camera) at different times. For example, patch 115 associated with the entity corresponding to the board of the table, cannot be captured by the camera of FIG. 11 at time and in pose 111, because this part of the board is occluded by vase 114 from this position of the camera. Patch 115 is captured by the unique illustrated camera when in pose 112, that is later in the sequence of 3D scenes. On the contrary, patch 116 is a part of the views captured by the illustrated camera at poses 111 and 112. Thus, when rendering the scene at a later frame i+n, the patches recorded in the database of the decoder at frame i may be no longer valid. In the existing formats (for example MIV), each patch is attached to a given view and, in the example of FIG. 11, a patch to render at frame i+n is still attached to the same view.

For rendering such a patch, it is therefore necessary to estimate the pose difference of the captured view between frame i (in pose 111) and i+n (in pose 112), in order for the decoder, to recover the pose parameters of view v at frame i in the MIV reference coordinate system at frame i+n. According to the present principles, illustrated in FIG. 11, rendering of a patch extracted from the view captured by the camera at pose 112 is performed applying to the corresponding patch captured by the same camera at view 111, the view pose parameters ($\vec{P}-\vec{\delta P}$, $\vec{R}-\vec{\delta R}$), that are the pose parameters of view 112 at frame i+n minus the pose parameters of view 111, between frame i and i+n.

According to the present principles, information is added to metadata associated with the current frame to signal whether the camera rig is moving and, as long as the camera rig (and therefore the views) moves, and to signal the camera poses increment at each frame.

The present principles involve:
For the encoder: to send an activation signal of the recording process of the pose increments of all views and deactivate the process when the camera rig stops moving.
For the encoder: to send at each frame the pose difference (delta-position and delta-orientation) for each view via a view update of extrinsic parameters:
pose_update (view v, +1), pose_update (view w, +1), pose_update (view x, +1), . . . .
pose_update (view v, +2), pose_update (view w, +2), pose_update (view x, +2), . . . .
pose_update (view v, +3), pose_update (view w, +3), pose_update (view x, +3), . . . .
etc.

For the client: to record these delta-pose series in a local memory.
For the client: when rendering at frame k a patch associated with view v but recorded at a previous frame i, to apply a correction to the extrinsic parameters of the current view v at this frame k by the accumulation of delta poses from i to k.

Patches recorded at previous frames can be repeatedly reprojected in the reconstructed 3D scene along with new patches of dynamic parts captured at current frame.

In a variant, in case of a non deformable object is moving in the 3D scene (instead of the camera rig), a virtual view or a virtual views subset is attached to the entity and apply the technique according to the present principles to that unique view or subset of views.

In another variant, the movement of the camera is transmitted as parameters of a mathematical functions, for example, as parameters representative of points and polynomial curves or as Bezier curves or as spline curves.

Having a large part of the 3D scene being static is very common. So that the geometry information of these fix parts of the 3D scene is constant. It is also frequent, that the texture appearance of such static scene changes because of varying lighting conditions and shadows, for example when moving foreground characters cast shadows to the close environment. In that case, two embodiments are proposed by the present principles to minimize the bitrate of texture information associated with these static patches:

1. Transmitting the video bitstream including the updated patch textures. In this first embodiment, such bitstream is expected to exhibit smooth variations, easy to compress by a video encoder.
2. Expressing these texture variations as parameters of a mathematical function, for example a polynomial function of u and v indices of the 2D texture map. This second embodiment is more compact than the first embodiment as it reduces both the bit rate and the pixel rate.

Like in the travelling case, it is necessary for the encoder to determine a texture of reference for a given patch. In practice, an encoder can always decide to make a reset of patch textures by resending an entity, but only for the texture part.

More precisely, it is necessary:
For the encoder to determine an entity update which resets the texture sample values of the patches, but not necessarily their geometry sample values.
For the encoder to compute and send texture updates of patches in between two entity updates.
For the client, to receive the texture update of a recorded patch, update the texture accordingly before rendering it with the other patches.

According to the present principles of the second embodiment, a temporal correction of the recorded texture at the view level is computed. This parameter corresponds, for example, to a Lens Shader in computer graphics engineering. In practice, it corresponds to defining a correction function per (R, G, B) component for all pixels (u, v) of the view j. Since any patch is related to a view, it will be possible to update any patch through this mean.

As an example of the second embodiment, a parameter is set for each view j and each sample (u, v) of the view j the triple polynomial function of u and v indices:

$$P\_r_j(u,v) = a\_r_j * u^2 + 2*b\_r_j * u*v + c\_r_j * v^2 + 2*d\_r_j * u + 2*e\_r_j * v + f\_r_j$$

$$P\_g_j(u,v) = a\_g_j * u^2 + 2*b\_g_j * u*v + c\_g_j * v^2 + 2*d\_g_j * u + 2*e\_g_j * v + f\_g_j$$

$$P\_b_j(u,v) = a\_b_j * u^2 + 2*b\_b_j * u*v + c\_b_j * v^2 + 2*d\_b_j * u + 2*e\_b_j * v + f\_b_j$$

where for example $b\_g_j$ stands for coefficient b of view j for green component.
Or formulated with c referring to component r, g, b:

$$P_j(u,v,c) = a_{c,j} * u^2 + 2*b_{c,j} * u*v + c_{c,j} * v^2\ 2*d_{c,j} * u + 2*e_{c,j} * v + f_{c,j}$$

where for example $b_{c,j}$ stands for coefficient b of view j for c component.

All coefficients are positive floating point value in limited definition, like 16 bits fl(16) and can express multiplication factor between 0 and more than 1.0. They relate to the texture difference between the recorded texture and the current texture, and are typically around 1.0 since the texture values are evolving typically slowly.

Because texture cannot exceed the [0, 255] range, the per view pixel multiplication should be followed by a clamping process as follows:

Update texture$(u,v,c)$=Clamp(0,255, Recorded_texture*$P_j(u,v,c)$)

with function Clamp(min, max, x)=defined as:
function Clamp(x, min, max):
  if (x<min) then
    x=min
  else if (x>max) then
    x=max
  return x The proposed mathematical polynomial function is an embodiment example and may not be operant in all cases. It may work only if the transport of light is uniform for the set of concerned patches, and away from mutual shadowing effect. But it is an important aspect of MIV specification that one view does not have to correspond to one true camera. For example, several syntactical views may be created out of a single original one and each patch of the original set may be attached to any of them. It therefore leads to patches partitions and these partitions may be used to map more easily a mathematical function such as the one presented above. Formally, the "syntactical views" are views taken from the pool of views originally created in the MIV encoder, which can be over-dimensioned for that purpose.

Figure 7:
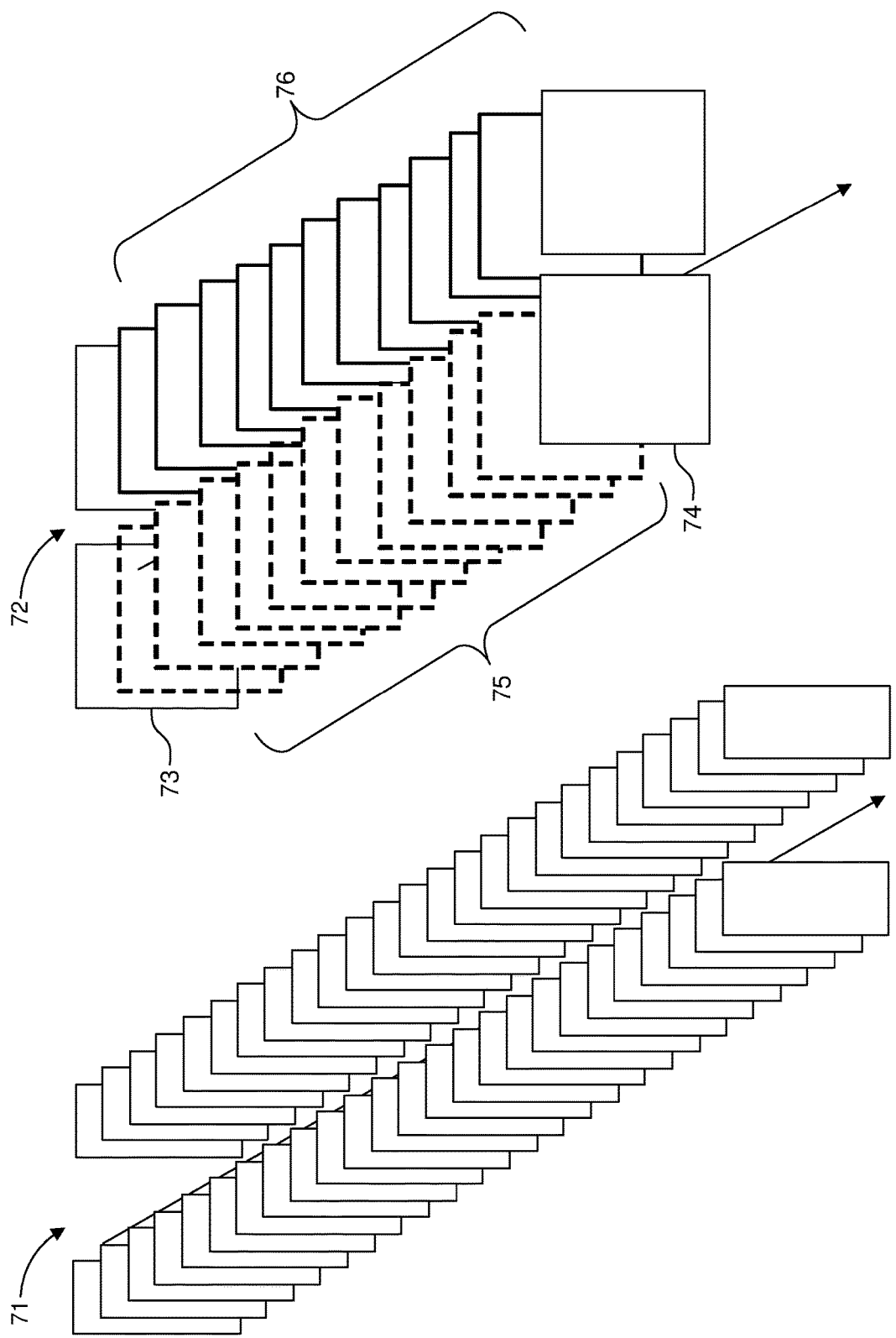
FIG. 7 depicts an example of a bit stream carrying two sequences of atlases.

FIG. 7 depicts an example of a bit stream carrying two sequences of atlases 71 and 72 according to the first embodiment of the present principles. Atlas sequence 71 is carrying the patches of dynamic scene parts, for instance patches corresponding to part 64 of FIG. 6. Atlas sequence 72 is transporting the static patches, for instance patches associated with other entities in FIG. 6. In this example, the static patch atlas is initialized at the first frame 73 (e.g. frame 61 of FIG. 6) of the sequence, and then updated at frame 74 (e.g. frame 62 of FIG. 6). According to the present principles, terms 'static patch' and 'static entity' are defined as following:
Static patch: A patch whose geometry, occupancy and attribute sample values remain constant temporally piecewise.
Static entity: A set of static patches.

The present format syntax structures comprise the following elements:
A sequence parameter set (VPS), in the header of the bitstream, signaling that the bitstream contains a "long term memory" component with static patches.
A sequence parameter set of the atlas (ASPS), associated with first frame 73, initializing the IDs of static entities.
A frame parameter of the atlas (AFPS) updating the IDs of static entities. A new AFPS element is associated with each updated static atlas frame (e.g. frames 73 and 74).

These syntax elements may, for instance, be formatted based on the MIV elements with the extension in bold:

|  | Descriptor |
|---|---|
| vps_miv_extension( ) { |  |
|   vme_geometry_scale_enabled_flag | u(1) |
|   vme_embedded_occupancy_enabled_flag | u(1) |
|   if( !vme_embedded_occupancy_enabled_flag ) |  |
|     vme_occupancy_scale_enabled_flag | u(1) |
|   group_mapping( ) |  |
|   vme_long_term_patch_memory_enabled_flag | u(1) |
|   if( vme_long_term_patch_memory_enabled_flag ) { |  |
|     vme_long_term_memory_atlas_count_minus1 | u(6) |
|     for( k = 0; k < vme_long_term_memory_atlas_count_minus1 + 1; k++ ) |  |
|     { |  |
|       vme_long_term_memory_atlas_id[ k ] | u(6) |
|     } |  |
| } |  |
| } |  | vme_long_term_patch_memory_enabled_flag equal to 1 specifies that static patches are grouped into dedicated atlases, referred to as 'long term memory atlases'.
vme_long_term_memory_atlas_count_minus1+1 specifies the number of long term memory atlases. It is a requirement of bitstream conformance that vme_long_term_memory_atlas_count_minus1 shall be less than vps_atlas_count_minus1.
vme_long_term_memory_atlas_id[k] specifies the ID of the long term memory atlas with index k. It is a requirement of bitstream conformance that vme_long_term_memory_atlas_id[k] shall be equal to one of the values of vps_atlas_id[j], for all j in the range of 0 to vps_atlas_count_minus1, inclusive.

| | Descriptor |
|---|---|
| asps_miv_extension( ) { | |
|   asme_ancillary_atlas_flag | u(1) |
|   asme_embedded_occupancy_enabled_flag | u(1) |
|   if( asme_embedded_occupancy_enabled_flag ) | |
|     asme_depth_occ_threshold_flag | u(1) |
|   asme_geometry_scale_enabled_flag | u(1) |
|   if( asme_geometry_scale_enabled_flag ) { | |
|     asme_geometry_scale_factor_x_minus1 | ue(v) |
|     asme_geometry_scale_factor_y_minus1 | ue(v) |
|   } | |
|   if( !asme_embedded_occupancy_enabled_flag ) | |
|     asme_occupancy_scale_enabled_flag | u(1) |
|   if( !asme_embedded_occupancy_enabled_flag && asme_occupancy_scale_enabled_flag ) { | |
|     asme_occupancy_scale_factor_x_minus1 | ue(v) |
|     asme_occupancy_scale_factor_y_minus1 | ue(v) |
|   } | |
|   asme_patch_constant_depth_flag | u(1) |
|   asme_patch_attribute_offset_enabled_flag | u(1) |
|   if( asme_patch_attribute_offset_enabled_flag ) | |
|     asme_patch_attribute_offset_bit_depth_minus1 | ue(v) |
|   asme_max_entity_id | ue(v) |
|   asme_inpaint_enabled_flag | u(1) |
|   asme_long_term_memory_flag | u(1) |
|   if( asme_long_term_memory_flag ) { | |
|     asme_num_init_static_entities_minus1 | ue(v) |
|     for( k = 0; k < asme_initial_num_init_static_entities_minus1 + 1; k++ ) | |
|       asme_init_static_entity_id[ k ] | u(v) |
|   } | |
| } | | asme_long_term_memory_flag equal to 1 indicates that the atlas contains static patches. It is a requirement of bitstream conformance that asme_long_term_memory_flag is equal to vme_long_term_memory_atlas_id[atlasID], where atlasID is the ID of the current atlas.

asme_num_init_static_entities_minus1+1 specifies the number of static entities at the beginning of the sequence.

asme_unit_static_entity_init_id[k] specifies the ID of the static entity with index k. It is a requirement of bitstream conformance that in the first frame of the current atlas, for any patch with index p, in a tile with ID equal to tileID, pdu_entity_id[tileID] [p] shall be equal to one of the values of asme_init_static_entity_id[k] for all k in the range of 0 to asme_num_init_static_entities_minus inclusive.

| | Descriptor |
|---|---|
| afps_miv_extension( ) { | |
|   if( !afps_lod_mode_enabled_flag ) { | |
|     afme_inpaint_lod_enabled_flag | u(1) |
|     if( afme_inpaint_lod_enabled_flag ) { | |
|       afme_inpaint_lod_scale_x_minus1 | ue(v) |
|       afme_inpaint_lod_scale_y_idc | ue(v) |
|     } | |
|   } | |
|   if( asme_long_term_memory_flag ) { | |
|     afme_update_static_entities_flag | u(1) |
|     if( afme_update_static_entities_flag ) | |
|       static_entities_update( ) | |
|   } | |
| } | |

| | Descriptor |
|---|---|
| static_entities_update( ) { | |
|   steu_num_removed_entities_minus1 | ue(v) |
|   for( k = 0; k < steu_num_removed_entities_minus1 + 1; k++ ) { | |
|     steu_removed_entity_id [ k ] | u(v) |
|   steu_num_modified_entities_minus1 | ue(v) |
|   for( k = 0; k < steu_num_modified_entities_minus1 + 1; k++ ) { | |
|     steu_modified_entity_id[ k ] | u(v) |
|   steu_num_new_entities_minus1 | ue(v) |
|   for( k = 0; k < steu_num_new_entities_minus1 + 1; k++ ) { | |
|     steu_new_entity_id[ k ] | u(v) |
| } | | afme_update_static_entities_flag equal to 1 specifies that updates of static entities are present in the atlas tiles referring to this AFPS.

steu_num_removed_entities_minus1+1 specifies the number of removed static entities.

steu_removed_entity_id[k] specifies the ID of the removed static entity with index k.

steu_num_modified_entities_minus1+1 specifies the number of modified static entities.

steu_modified_entity_id[k] specifies the ID of the modified static entity with index k.

steu_num_new_entities_minus1+1 specifies the number of new static entities.

steu_new_entity_id[k] specifies the ID of the new static entity with index k.

In a variant of the first embodiment, the entity ID syntax element to group static patches is signaled with the V3C volumetric annotation SEI message family which enables associating object to patches. The same principle of attaching the IDs of removed, modified or new entities to each static frame update applies, but carried into a SEI message rather than within the core MIV bitstream.

In addition, a texture atlas video bitstream 76 carrying the smooth variations due to lighting changes in between two updates of the static geometry is encoded in the bitstream, with additional syntax flags in the ASPS to signal that there is additional update information in the texture video bitstream.

| | Descriptor |
|---|---|
| asps_miv_extension( ) { | |
|   (...) | |
|   asme_long_term_memory_flag | u(1) |
|   if( asme_long_term_memory_flag ) { | |
|     asme_texture_update_flag | u(1) |
|     if(asme_texture_update_flag ) { | |
|       asme_texture_update_refresh_period_minus1 | ue(v) |
|       asme_num_init_static_entities_minus1 | ue(v) |
|       for( k = 0; k < asme_initial_num_init_static_entities_minus1 + 1; k++ ) | |
|         asme_init_static_entity_id[ k ] | u(v) |
|     } | |
| } | | asme_texture_update_flag equal to 1 specifies that the frames of the texture video bitstream carry texture update sample values in-between two updates of the static entities.

asme_texture_update_refresh_period_minus1 plus 1 specifies the period T of the temporal updates of texture sample values (refreshed every other T frames). When not present, the value of asme_texture_update_refresh_period_minus1 is inferred to be equal to 0.

In a variant of the first embodiment, the geometry frames 75 are not repeated. Only texture frames 76 are repeated.

Existing patch atlas-based formats like MIV enforce that all geometry and attribute video sub-bitstreams, for all atlases if many, are time aligned (with respect to encoding order). The static video sub-bitstream 72, as illustrated in FIG. 7, do not have the same temporal behaviour as other MIV video sub-bitstreams. Atlas sequence 72 consists of a set of video frames, sampled at random time locations (corresponding to static entity updates), as opposed to the continuous, regular, sampling of atlas sequence 71. In the example of FIG. 7, video tracks 71 and 72 carry several video sub-bitstreams with a same atlas layout, for example, one depth video sub-bitstream and an additional video sub-bitstream for every attribute (e.g. color, transparency, reflectance, etc.).

In the second embodiment, each geometry and attribute video frames update are encoded as an intra coded frame in a video bitstream only consisting of those few frames, without geometry frame repeat 75 in between. This second embodiment requires a decoder able to support such geometry and attribute video bitstreams not time aligned with the video sub-bitstreams of the dynamic parts.

In the second embodiment, a Common Atlas Frame (CAF) information is added to the metadata to signal the polynomial coefficients of the lens shader is required.

| | Descriptor |
|---|---|
| caf_miv_extension( ) { | |
|   if( nal_unit_type == NAL_IRAP_CAF ) { | |
|     miv_view_params_list( ) | |
|   } else { | |
|     came_update_extrinsics_flag | u(1) |
|     came_update_intrinsics_flag | u(1) |

| | Descriptor |
|---|---|
|     came_texture_update_flag | u(1) |
|     if( casme_depth_quantization_params_present_flag ) | |
|       came_update_depth_quantization_flag | u(1) |
|     if( came_update_extrinsics_flag ) | |
|       miv_view_params_update_extrinsics( ) | |
|     if( came_update_intrinsics_flag ) | |
|       miv_view_params_update_intrinsics( ) | |
|     if( came_update_depth_quantization_flag ) | |
|       miv_view_params_update_depth_quantization( ) | |
|     if( came_texture_update_flag ) | |
|       miv_texture_update( ) | |
|   } | |
| } | |

| | Descriptor |
|---|---|
| miv_texture_update( ) { | |
|   for( v = 0; v <= mvp_num_views_minus1; v++ ) { | |
|     viewID = ViewIndexToID[ v ] | |
|     view_texture_update( viewID ) | |
|   } | |
| } | |

| | Descriptor |
|---|---|
| view_texture_update( viewID ) { | |
|   for( c = 0; c <= 3; c++ ) | |
|     for( k = 0; k <= 6; c++ ) | |
|       lens_shader[ c ][ k ] | fl(16) |
| } | |

A Common Atlas Frame with came_texture_update_flag equal to 1 is sent for each frame of the static atlas with texture update due to lighting changes. Thus, the decoder is informed that texture patch sample values have to be updated through the lens shader function of the view associated with the patch. Such texture update is valid until a new CAF with came_texture_update_flag equal to 1 is received.

Proposed syntax can be combined to simultaneously signal compensation of camera movement and lighting changes.

Figure 8A:
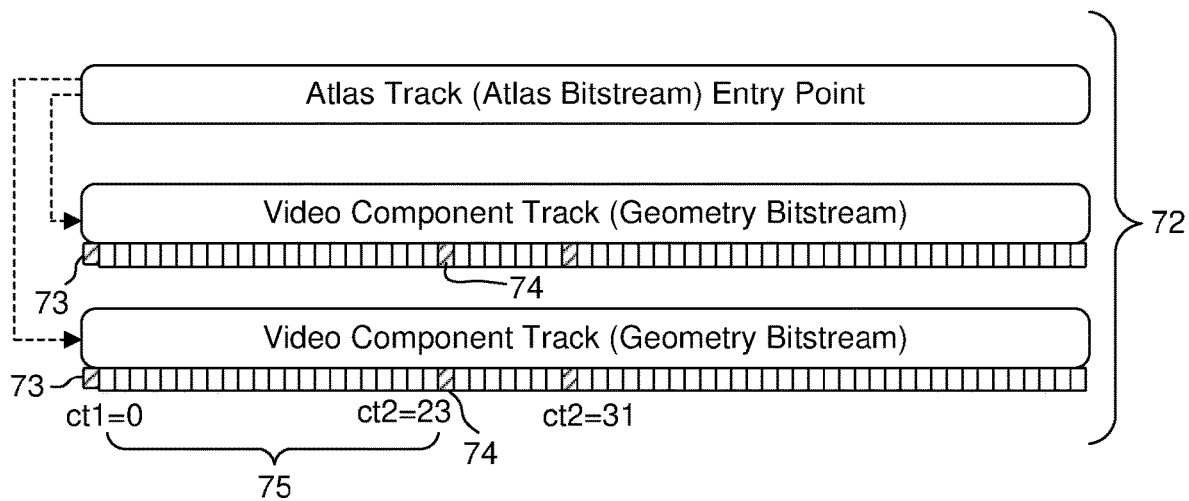
FIG. 8a illustrates a multi-bitstream encapsulation transport format of a static atlas data according to the first embodiment.

FIG. 8a illustrates a multi-bitstream encapsulation transport format of a static atlas data according to the first embodiment. Frame updates 73 and 74 are depicted darker than the other samples corresponding to repeated geometry frames 75 in the video bitstream.

Figure 8B:
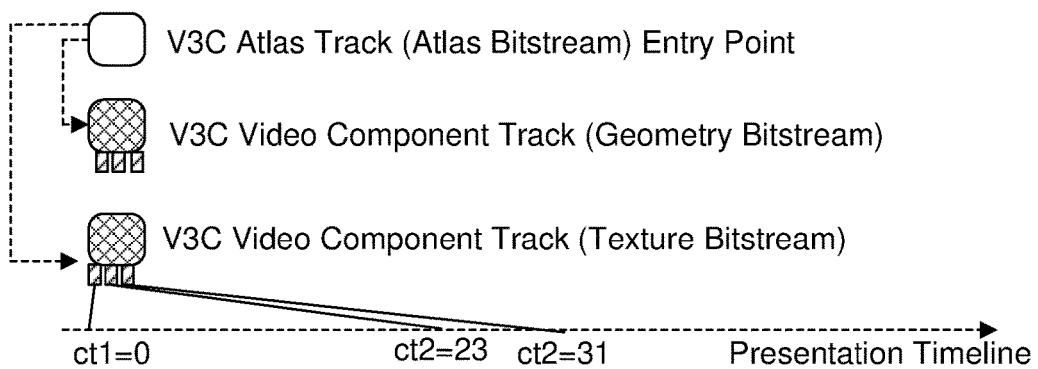
FIG. 8b illustrates a multi-bitstream encapsulation transport format of a static atlas data according to the second embodiment.

FIG. 8b illustrates a multi-bitstream encapsulation transport format of a static atlas data according to the second embodiment. The frame updates of geometry and attributes are encoded as a succession of intra-coded frames, without frame repeat. The composition time associated with each sample signals the proper time of the updates. ct1, ct2 and ct3 are the time stamps of the three updates. The first sample is used by the client for content presentation during the interval [ct1, ct2[, the second sample during the interval [ct2, ct3[and the third sample from ct3 to the end of the sequence.

At the decoder and renderer side, the client is able to enter new entities, delete obsolete ones, and update others. The client (e.g. client 23 of FIG. 2, for instance implemented in a device 30 of FIG. 3) receives a bitstream according to FIG. 8a or 8b from a broadcast server or read the bit stream from a memory. In a broadband client-server architecture, the client application is in charge of requesting chunks of signal, like for example DASH segments. The client application parses the bitstream, extracts the metadata and video-decodes the geometry and attributes sub-bitstreams. Thanks to a signalling at the entity level, the decoder decodes patches from the dynamic atlases and sends them to the renderer and access to a local data base for obtaining the static patches according to the entity they are associated with. The renderer merges both the dynamic part and the static part to output the rendering of the full scene.

FIG. 9 illustrates a method 90 for encoding a 3D scene according to a non-limiting embodiment of the present principles. At a step 91, dynamic patches and static patches are obtained from an automatic analysis of the 3D scene to encode. The analysis is performed as described in relation to FIG. 5, for example. A static patch is a patch whose geometry, occupancy and attributes sample values remain constant temporally piecewise. Every static patch is associated with an entity of the 3D scene. A dynamic patch is a patch that frequently varies from 3D scene to the next one in the sequence. At a step 92, dynamic patches are packed in a first atlas. At a step 93, the obtained static patches are compared to the patches obtained for the previous 3D scene in the sequence of 3D scenes that constitute the 3D video. If the 3D scene to encode is the first one of the sequence, then, static patches are considered different. On condition that they are different, a step 94 is performed. At step 94, the obtained static patches are packed in a second atlas. Metadata comprising instructions are generated according to the entities associated with the static patches and according to the entities associated with the static patches of the previous 3D scene in the sequence. When there is no difference for an entity, no instruction is generated. When an entity is new (i.e. the entity was not associated to previous static patches), an instruction for the client to create, for the 3D scene, a new entry in its local memory, for example structured as a database, associating the entity with static patches that are associated with the entity, is added to the metadata. When an entity is no longer associated with any static patches, an instruction for the client to delete from the local memory, the entry associating the entity with static patches, is added to the metadata. When static patches associated with an entity differ from the static patches of the previous 3D scene in the sequence (because of their number, size, values, . . . ) an instruction for the client to update with static patches associated with the entity, for the 3D scene, the entry of the local memory associating the entity with static patches, is added to the metadata. Then a step 95 is performed for encoding the first atlas, the second atlas and the generated metadata in the data stream. In a variant, the first atlas is encoded in a first video sub-bitstream and the second atlas is encoded in a second video sub-bitstream of the data stream. If, at step 93, it was determined that the static patches are not different from the static patches of the previous 3D scene in the sequence, then, only the first atlas is encoded in the data stream at step 95. In another embodiment, a step 96 is performed in this case. A second atlas is obtained at step 96 (by packing static patches obtained at step 91 or by reusing the second atlas generated for the previous 3D scene). In this other embodiment, the first atlas and the second atlas are encoded in the data stream at step 95.

FIG. 10 illustrates a method 100 for rendering a 3D scene from a data stream. At a step 101, a first patch atlas is decoded from the data stream. At a step 102, a second atlas and associated metadata is decoded from the data stream. If there is no second atlas or if there is no associated metadata, step 102 may be skipped. In other case, a local data structure (e.g. a database) maintained in memory by the decoder is updated at a step 103. The local data structure stores entries that associate entities with respective sets of static patches. Instructions of the metadata may be:

creating, for the 3D scene, a new entry in the local data structure associating the entity with a subset of patches of the second atlas;

updating with a subset of patches of the second atlas, for the 3D scene, the entry of the local data structure associating the entity with second patches; or deleting from the local data structure, the entry associating the entity with second patches;

At step 103, every instruction of the metadata is performed by using second patches of the decoded second atlas.

At a step 104, the local data structure is used to retrieve the second patches associated with the entities of the 3D scene visible for the rendering. The data structure has been updated the last time instructions has been obtained with a second atlas (which carries static patches). At a step 105, the 3D scene is rendered by inverse projecting the first patches from the data stream and second patches from the data structure.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
obtaining, from a data stream, a second atlas packing one or more static patches for a first three-dimensional (3D) scene of a sequence of 3D scenes, a static patch being associated with an entity of the first 3D scene, an entity being a part of the first 3D scene;
updating one or more entries of a local memory with the one or more static patches;
obtaining, from the data stream, a first atlas packing one or more-dynamic patches for a second 3D scene of the sequence of 3D scenes;
obtaining entries from the local memory corresponding to static patches associated with an entity visible in a viewport to render; and
rendering the second 3D scene by inverse projecting the one or more dynamic patches and static patches of obtained entries.

2. The method of claim 1, further comprising:
obtaining, from the data stream, metadata indicating, for an entity of the first 3D scene, a set of instructions, an instruction comprising:
creating, for the first 3D scene, a new entry in the local memory associating the entity with a subset of patches of the second atlas;
updating, for the first 3D scene, the entry of the local memory associating the entity with second patches, with a subset of patches of the second atlas; and
deleting from the local memory, the entry associating the entity with second patches; and
updating the local memory by applying the instruction indicated in the metadata.

3. The method of claim 1, wherein an entry associates an entity of the first 3D scene with static patches of the first 3D scene and with one or more adaptation parameters representative of a camera movement and/or of a lighting change; and the method further comprising adapting the one or more static patches according to the one or more adaptation parameters.

4. The method of claim 3, wherein the one or more adaptation parameters are representative of one or more parameters of a parametrized function, the parametrized function belonging to a set of parametrized functions comprising:
polynomial functions;
Bezier functions; and
Spline functions.

5. The method of one of claim 1, wherein the entries from the local memory for the first 3D scene are the entries from the local memory for a previous 3D scene in the sequence of 3D scenes.

6. The method of claim 1, wherein the data stream comprises a first sub-bitstream carrying first atlases and a second sub-bitstream carrying second atlases.

7. A method comprising:
obtaining a first atlas packing one or more dynamic patches of a three-dimensional (3D) scene of a sequence of 3D scenes;
obtaining one or more static patches of the 3D scene, a static patch being associated with an entity, an entity being a part of the 3D scene;
encoding the first atlas in a data stream;
on condition that at least one static patch differs from static patches of a previous 3D scene in the sequence of 3D scenes:
packing one or more static patches in a second atlas and generating metadata indicating, for an entity associated with a static patch, an instruction for a client to:
create, for the 3D scene, a new entry in a local memory associating the entity with static patches associated with the entity; or update, for the 3D scene, the entry of the local memory associating the entity with static patches, with static patches associated with the entity; or delete from the local memory, the entry associating the entity with static patches; and encoding the second atlas and the metadata in the data stream.

8. The method of claim 7, wherein an entry associates an entity of the 3D scene with static patches for the 3D scene and one or more adaptation parameters representative of a camera movement and/or of a lighting change; and the method further comprising encoding the one or more adaptation parameters in the metadata.

9. The method of claim 8, wherein the adaptation parameters are representative of one or more parameters of a parametrized function, the parametrized function belonging to a set of parametrized functions comprising:

polynomial functions;
Bezier functions; and
Spline functions.

10. The method of claim 7, wherein the first atlas is encoded in a first sub-bitstream of the data stream and the second atlas is encoded in a second sub-bitstream of the data stream.

11. A device comprising a processor configured to:

obtain, from a data stream, a second atlas packing one or more static patches for a first 3D scene of a sequence of 3D scenes, a static patch being associated with an entity of the 3D scene, an entity being a part of the first 3D scene ;

update one or more entries of a local memory with the one or more static patches;

obtain, from the data stream, a first atlas packing one or more dynamic patches for a second 3D scene of the sequence of 3D scenes;

obtain entries from a local memory corresponding to static patches associated with entities visible in a viewport to render; and render the second 3D scene by inverse projecting one or more dynamic patches and static patches of obtained entries.

12. The device of claim 11, wherein the processor is further configured to:

obtain, from the data stream, metadata indicating, for an entity of the first 3D scene, a set of instructions, an instruction comprising:

creating, for the first 3D scene, a new entry in the local memory associating the entity with a subset of patches of the second atlas;

updating, for the first 3D scene, the entry of the local memory associating the entity with second patches, with a subset of patches of the second atlas; and deleting from the local memory, the entry associating the entity with second patches; and update the local memory by applying the instruction indicated in the metadata.

13. The device of claim 11, wherein an entry associates an entity of the first 3D scene with static patches for the first 3D scene and with one or more adaptation parameters representative of a camera movement and/or of a lighting change; and the processor being further configured to adapt the static patches according to the one or more adaptation parameters.

14. The device of claim 13, wherein the one or more adaptation parameters are representative of parameters of a parametrized function, the parametrized function belonging to a set of parametrized functions comprising:

polynomial functions;
Bezier functions; and
Spline functions.

15. The device of claim 11, wherein the entries from the local memory for the first 3D scene are the entries of the local memory for a previous 3D scene in the sequence of 3D scenes.

16. The device of claim 11, wherein the data stream comprises a first sub-bitstream carrying first atlases and a second sub-bitstream carrying second atlases.

17. A device comprising a processor configured to:

obtain a first atlas packing one or more dynamic patches of a 3D scene of a sequence of 3D scenes;

obtain one or more static patches of the 3D scene, a static patch being associated with an entity, an entity being a part of the 3D scene;

encode the first atlas in a data stream;

on condition that at least one static patch differs from the static patches of a previous 3D scene in the sequence of 3D scenes:

pack static patches in a second atlas and generating metadata indicating, for an entity associated with a static patch, an instruction for a client to:

create, for the 3D scene, a new entry in a local memory associating the entity with static patches associated with the entity; or update, for the 3D scene, the entry of the local memory associating the entity with static patches, with static patches associated with the entity; or delete from the local memory, the entry associating the entity with static patches; and encode the second atlas and the metadata in the data stream.

18. The device of claim 17, wherein an entry associates an entity of the 3D scene with static patches for the 3D scene and one or more adaptation parameters representative of a camera movement and/or of a lighting change; and the processor being further configured to encode the one or more adaptation parameters in the metadata.

19. The device of claim 18, wherein the one or more adaptation parameters are representative of parameters of a parametrized function, the parametrized function belonging to a set of parametrized functions comprising:

polynomial functions;
Bezier functions; and
Spline functions.

20. The device of claim 18, wherein the first atlas is encoded in a first sub-bitstream of the data stream and the second atlas is encoded in a second sub-bitstream of the data stream.

* * * * *